US009669823B2

(12) United States Patent
Shibata et al.

(10) Patent No.: US 9,669,823 B2
(45) Date of Patent: Jun. 6, 2017

(54) ENGAGEMENT DEVICE AND POWER TRANSMISSION DEVICE

(71) Applicants: Hiroyuki Shibata, Odawara (JP); Hideaki Komada, Gotemba (JP); Hiroyuki Shioiri, Numazu (JP); Kouhei Miyake, Susono (JP); Shotaro Kato, Susono (JP)

(72) Inventors: Hiroyuki Shibata, Odawara (JP); Hideaki Komada, Gotemba (JP); Hiroyuki Shioiri, Numazu (JP); Kouhei Miyake, Susono (JP); Shotaro Kato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/783,990

(22) PCT Filed: Apr. 16, 2013

(86) PCT No.: PCT/JP2013/061330
§ 371 (c)(1),
(2) Date: Oct. 12, 2015

(87) PCT Pub. No.: WO2014/170966
PCT Pub. Date: Oct. 23, 2014

(65) Prior Publication Data
US 2016/0059849 A1    Mar. 3, 2016

(51) Int. Cl.
| | |
|---|---|
| *B60K 6/383* | (2007.10) |
| *B60W 20/40* | (2016.01) |
| *F16D 11/14* | (2006.01) |
| *B60K 6/387* | (2007.10) |
| *B60K 6/445* | (2007.10) |
| *B60W 10/02* | (2006.01) |
| *B60W 10/08* | (2006.01) |

(Continued)

(52) U.S. Cl.
CPC ............. *B60W 20/40* (2013.01); *B60K 6/383* (2013.01); *B60K 6/387* (2013.01); *B60K 6/445* (2013.01);
(Continued)

(58) Field of Classification Search
CPC ...... B60W 10/02; B60W 10/08; B60W 20/40; B60K 6/383; B60K 6/387; F16D 11/14;
(Continued)

(56) References Cited

U.S. PATENT DOCUMENTS

| | | | |
|---|---|---|---|
| 2,466,318 A | 4/1949 | Kohr | |
| 2,875,876 A * | 3/1959 | Rudisch | ................ F16D 27/09 |
| | | | 192/69.8 |

(Continued)

FOREIGN PATENT DOCUMENTS

| | | |
|---|---|---|
| JP | 2002-222102 A | 8/2002 |
| JP | 2003-011682 | 1/2003 |

(Continued)

OTHER PUBLICATIONS

"Disconnecting for Fuel efficiency" Sep. 24, 2015 (retrieval date), submitting summary only, video can be viewed at: http://www.gkn.com/driveline/technologyandinnovation/Pages/disconnecting-for-fuel-efficiency.aspx.

(Continued)

*Primary Examiner* — J. Allen Shriver, II
*Assistant Examiner* — Steve Clemmons
(74) *Attorney, Agent, or Firm* — Oblon, McClelland, Maier & Neustadt, L.L.P.

(57) ABSTRACT

An engagement device includes: an engaged portion disposed rotatably about a rotating shaft and configured to rotate in conjunction with the rotating shaft; an engaging portion disposed coaxially with the engaged portion and configured to perform engagement with the engaged portion (Continued)

and release from the engagement with the engaged portion by shifting in an axial direction; a control unit configured to control rotation of the engaged portion and shifting of the engaging portion in the axial direction; and a one-way clutch disposed on a power transmission path from the rotating shaft to a coupling member coupled to the engaging portion. The control unit is configured to rotate the engaged portion in an idling direction of the one-way clutch, at a time of performing engagement or release of the engaging portion with or from the engaged portion.

9 Claims, 8 Drawing Sheets (51) Int. Cl.
*F16H 61/04* (2006.01)
(52) U.S. Cl.
CPC ............ *B60W 10/02* (2013.01); *B60W 10/08* (2013.01); *F16D 11/14* (2013.01); *F16H 61/04* (2013.01); *B60Y 2400/421* (2013.01); *B60Y 2400/427* (2013.01); *F16H 2061/044* (2013.01); *F16H 2061/0474* (2013.01); *Y02T 10/6239* (2013.01); *Y10S 903/902* (2013.01)
(58) Field of Classification Search
CPC ........ F16D 2011/004; B60Y 2400/421; B60Y 2400/427
See application file for complete search history.

(56) References Cited

U.S. PATENT DOCUMENTS

| | | | | |
|---|---|---|---|---|
| 3,068,975 | A * | 12/1962 | Theuer | F16D 55/02 188/171 |
| 4,576,063 | A * | 3/1986 | Akashi | F16H 3/006 74/331 |
| 7,331,894 | B2 * | 2/2008 | Sowul | F16D 25/061 192/69.91 |
| 7,597,648 | B2 * | 10/2009 | Conlon | B60K 6/365 180/65.7 |
| 8,475,332 | B2 * | 7/2013 | Ishii | B60K 6/445 477/8 |
| 8,547,192 | B2 * | 10/2013 | Ideshio | F16D 27/118 335/220 |
| 8,905,212 | B2 * | 12/2014 | Vierk | F16D 11/14 192/53.1 |
| 8,960,034 | B2 * | 2/2015 | Takahashi | B60K 6/445 475/5 |
| 9,011,289 | B2 * | 4/2015 | Goleski | F16D 25/061 192/48.6 |
| 9,222,549 | B2 * | 12/2015 | Mellet | F16H 3/62 |
| 2006/0169502 | A1 * | 8/2006 | Kano | B60K 6/405 180/65.235 |
| 2011/0079097 | A1 | 4/2011 | Cavallino | |
| 2011/0177900 | A1 * | 7/2011 | Simon | B60K 6/445 475/5 |
| 2016/0131203 | A1 * | 5/2016 | Ebuchi | F16D 11/14 192/84.92 |

FOREIGN PATENT DOCUMENTS

| | | | |
|---|---|---|---|
| JP | 2010-036880 | | 2/2010 |
| JP | 2010-065804 | A | 3/2010 |
| JP | 2010242895 | A * | 10/2010 |
| JP | 2012-193851 | A | 10/2012 |
| JP | 5099075 | B2 * | 12/2012 |
| JP | 2013-517175 | | 5/2013 |

OTHER PUBLICATIONS

International Search Report issued on Jun. 11, 2013 for PCT/JP2013/061330 filed on Apr. 16, 2013.

* cited by examiner

ENGAGEMENT DEVICE AND POWER TRANSMISSION DEVICE

FIELD

The present invention relates to an engagement device and a power transmission device.

BACKGROUND

In the related art, an engagement device using a gearing type dog clutch structure is known (for example, Patent Literature 1).

CITATION LIST

Patent Literature

Patent Literature 1: Japanese Patent Application Laid-open No. 2010-065804

SUMMARY

Technical Problem

In the dog clutch structure in the related art, variations in phase between a piece and a sleeve at the time of engagement have sometimes caused torque transmission without a sufficient engagement width, or ratcheting. In such a case, there have been risks of deteriorating durability of a dog tooth, including damage of the dog tooth locally subjected to a large force. Thus, there has remained room for improvement of the engagement device in terms of durability.

The present invention has been made in view of the above, and an object thereof is to provide an engagement device and a power transmission device that can improve durability.

Solution to Problem

To solve the above-described problem, an engagement device according to the present invention includes: an engaged portion disposed rotatably about a rotating shaft and configured to rotate in conjunction with the rotating shaft; an engaging portion disposed coaxially with the engaged portion and configured to perform engagement with the engaged portion and release from the engagement with the engaged portion by shifting in an axial direction; a control unit configured to control rotation of the engaged portion and shifting of the engaging portion in the axial direction; and a one-way clutch disposed on a power transmission path from the rotating shaft to a coupling member coupled to the engaging portion, wherein the control unit is configured to rotate the engaged portion in an idling direction of the one-way clutch, at a time of performing engagement or release of the engaging portion with or from the engaged portion.

Moreover, in the above-described engagement device, it is preferable that the engaging portion and the engaged portion constitute a dog clutch.

Moreover, in the above-described engagement device, it is preferable that the one-way clutch is disposed closer to the coupling member than the engaging portion on the power transmission path.

Moreover, it is preferable that the above-described engagement device includes: a hub configured to couple the engaging portion to the one-way clutch; and a connecting member configured to connect the one-way clutch to the coupling member, and that the control unit includes a driving source configured to drive the engaging portion, the engaging portion, the engaged portion, the hub, and the one-way clutch are disposed on an inner circumferential side of the driving source, the engaging portion, the hub, and the one-way clutch are disposed in this order from outside to inside in a radial direction, an outer race of the one-way clutch is integrated with the hub, and an inner race of the one-way clutch is integrated with the connecting member.

Similarly to solve the above-described problem, a power transmission device according to the present invention includes the above-described engagement device provided on a power transmission path from a power source to a driving wheel.

It is preferable that the above-described power transmission device includes: an engine; a first rotating machine; a power distribution mechanism connected to the engine and the first rotating machine and configured to distribute power of the engine to a driving wheel and the first rotating machine; and a second rotating machine connected to the driving wheel, and that the engaged portion of the engagement device is coupled to a rotating shaft of the first rotating machine, the one-way clutch of the engagement device is disposed to idle in a negative rotational direction of the first rotating machine, the control unit of the engagement device is configured to perform control for restricting rotation of the first rotating machine by engaging the engaging portion with the engaged portion, and the one-way clutch is suppressed from idling by controlling rotation of the engaged portion and generating a torque in an engaging direction of the one-way clutch, while the control is performed and when there is an engine braking request.

Advantageous Effects of Invention

The engagement device and power transmission device according to the present invention can advantageously improve durability.

DESCRIPTION OF EMBODIMENTS

Embodiments of the engagement device according to the present invention will be described below. In the following figures, identical or equivalent sections bear the identical reference number, and the description thereof will not be repeated.

[First Embodiment]

Figure 1:
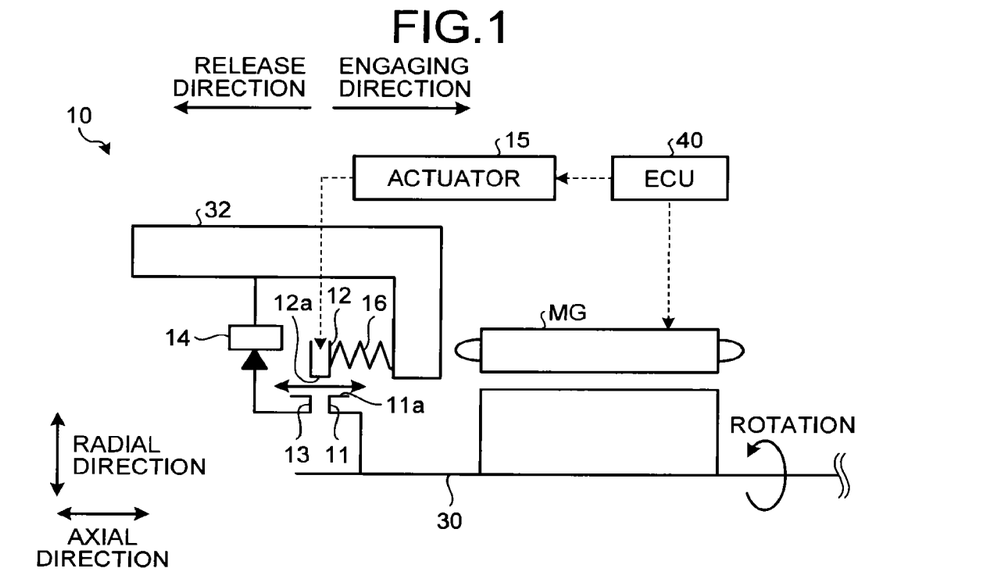
FIG. 1 is a pattern diagram illustrating a schematic configuration of an engagement device according to a first embodiment of the present invention.

The first embodiment will be described with reference to FIGS. 1 to 5. First, a configuration of an engagement device 10 according to the first embodiment will be described with reference to FIG. 1. FIG. 1 is a pattern diagram illustrating a schematic configuration of the engagement device according to the first embodiment.

The engagement device 10 disconnects a power transmission path from a power sending side to a power receiving side, and is, in a hybrid vehicle for example, built in a power transmission device that transmits a driving force from a driving source such as an engine and a motor to an output shaft. The engagement device 10 is used as a clutch device or a brake device, in order to control the driving force transmitted from the power transmission device to the output shaft, for example. The clutch device disconnects power transmission between rotating elements of the power transmission device. The brake device restricts the rotation of a part of the rotating elements of the power transmission device.

As one example of application, the engagement device 10 illustrated in FIG. 1 is configured to restrict the rotation of a rotating shaft 30 that transmits the driving force output from a motor generator MG to the output shaft. The engagement device 10 includes the motor generator MG, a piece 11 (engaged portion), a sleeve 12 (engaging portion), a hub 13, a one-way clutch 14, an actuator 15, and an electronic control unit (ECU) 40.

The piece 11 and the sleeve 12 are disposed about the rotating shaft 30. The rotating shaft 30 is supported by a base body 32 such as a housing which includes components of the power transmission device, for example. The rotating shaft 30 extends in the horizontal direction of FIG. 1. In the following descriptions, unless otherwise specifically noted, the horizontal direction of FIG. 1 will be described as the "axial direction" of the rotating shaft 30, while the vertical direction of FIG. 1 will be described as the "radial direction" of the rotating shaft 30. In addition, a direction around the rotating shaft 30 will be described as the "circumferential direction".

The piece 11 is disposed rotatably about the rotating shaft 30, and coupled to rotate in conjunction with the rotating shaft 30. The piece 11 is restricted from shifting in the axial and radial directions.

The sleeve 12 is disposed outside the piece 11 in the radial direction. The sleeve 12 is shiftable in the axial direction and is restricted from shifting in the radial direction.

The sleeve 12 and the piece 11 can engage/release an inner peripheral surface of the sleeve 12 with/from an outer peripheral surface of the piece 11 by the shifting of the sleeve 12 in the axial direction. On the outer peripheral surface of the piece 11, a dog tooth 11a is disposed along the circumferential direction around the rotating shaft 30 toward the outside in the radial direction. On the inner peripheral surface of the sleeve 12, a dog tooth 12a is disposed along the circumferential direction around the rotating shaft 30 toward the inside in the radial direction. Tooth traces of the dog teeth 11a and 12a extend in the axial direction. These dog teeth 11a and 12a serve as an engaging dog clutch, and by engaging with each other, can engage the piece 11 with the sleeve 12. By engaging the sleeve 12 with the piece 11, the rotations of the motor generator MG and the rotating shaft 30 can be fixed.

As with the piece 11 and the sleeve 12, the hub 13 is disposed around the rotating shaft 30. The hub 13 is disposed inside the sleeve 12 in the radial direction, and spline-fits the sleeve 12 on an outer peripheral surface thereof. That is, the sleeve 12 is restricted, by being fit into the hub 13, from shifting in the circumferential direction relative to the hub 13, and is disposed shiftably in the axial direction. The hub 13 is disposed adjacent to the piece 11 on the side of the release direction in the axial direction. In other words, the sleeve 12 can freely shift in the axial direction along the outer peripheral surface of the hub 13, engage with the piece 11 by protruding from the hub 13 into the engaging direction in the axial direction, and release engagement with the piece 11 by shifting from above the piece 11 in the release direction in the axial direction and returning on the outer peripheral surface of the hub 13.

The hub 13 is coupled to the base body 32 (coupling member), and restricted from shifting in the radial and axial directions. A coupling portion between the hub 13 and the base body 32 is provided with the one-way clutch 14.

The one-way clutch 14 performs power transmission by engaging during rotation in one direction, and interrupts power transmission by idling during rotation in the other direction. By this one-way clutch 14, the hub 13 and the sleeve 12 spline-fitted to the hub 13 are restricted from rotating in one direction about the rotating shaft 30, and disposed rotatably in the other direction. When the sleeve 12 is engaged with the piece 11, the piece 11 and the rotating shaft 30 are also restricted from rotating in one direction. In this embodiment, during the engagement of the engagement device 10, the one-way clutch 14 is disposed to engage when the rotating shaft 30 rotates in the positive rotational direction of the motor generator MG. The one-way clutch 14 is also disposed such that the idling direction thereof becomes a negative rotational direction of the motor generator MG.

The actuator 15 is a power source to generate the driving force in the axial direction and shift the sleeve 12 in the axial direction in accordance with a control command from the ECU 40. The actuator 15 is a solenoid type electromagnetic actuator, for example.

The sleeve 12 can shift in a direction toward the piece 11 in the axial direction (engaging direction) or in a direction away from the piece 11 (release direction) by being provided with thrust in the axial direction by the actuator 15. When the sleeve 12 shifts in the engaging direction and the dog tooth 12a of the sleeve 12 engages with the dog tooth 11a of the piece 11, the sleeve 12 is engaged with the piece 11. When the sleeve 12 shifts in the release direction and the dog tooth 12a of the sleeve 12 moves away from the dog tooth 11a of the piece 11, the engagement of the sleeve 12 with the piece 11 is released.

The engagement device 10 can switch between engagement and release by shifting the sleeve 12 in the axial direction with the driving force provided by the actuator 15. During engagement, the dog tooth 12a of the sleeve 12 is connected to the dog tooth 11a of the piece 11 such that these dog teeth are incapable of relative rotation. Thus, when the engagement device 10 is engaged, the power transmission path is connected from the rotating shaft 30 through the piece 11, the sleeve 12, and the hub 13. At this time, the rotating shaft 30 is allowed to rotate only in one direction by the one-way clutch 14. On the other hand, when the engagement device 10 is released, the rotating shaft 30 is allowed to rotate.

On the side of the engaging direction of the sleeve 12, a return spring 16 is connected. The return spring 16 is set expandably along the axial direction. When the sleeve 12 shifts in the direction of engaging with the piece 11 during engagement control, the return spring 16 shrinks in response to the shifting of the sleeve 12 in the axial direction and generates an energizing force in the release direction. This energizing force returns the axial position of the sleeve 12 in the release direction, when the thrust by the actuator 15 is lost.

The ECU 40 is a control device for controlling portions of a vehicle based on the information from various types of sensors in the vehicle. The ECU 40 of this embodiment, in particular, controls the thrust of the actuator 15, adjusts the axial position of the sleeve 12, and performs engagement and release operations of the sleeve 12 and the piece 11. During the engagement and release operations, the ECU 40 also controls rotation of the motor generator MG such that the rotational direction of the piece 11 becomes the idling direction of the one-way clutch 14.

Here, the ECU 40 is physically an electronic circuit mainly including a known microcomputer which includes a central processing unit (CPU), a random access memory (RAM), a read only memory (ROM), an interface, and the like. The above-mentioned functions of the ECU 40 are realized by operating various devices in the vehicle under the control of the CPU as well as reading and writing data in the RAM and ROM, by loading an application program stored in the ROM to the RAM and executing the application program on the CPU.

In this embodiment, the motor generator MG, the actuator 15, the return spring 16, and the ECU 40 function as a control unit controlling the rotation of the piece 11 and the shifting of the sleeve 12 in the axial direction.

In the engagement device 10, when the piece 11 rotates in conjunction with the rotating shaft 30 of the motor generator MG, a rotation torque of the motor generator MG is transmitted to the base body 32 through the piece 11, the sleeve 12, the hub 13, and the one-way clutch 14. That is, in this embodiment, when the piece 11 engages with the sleeve 12, the base body 32 functions as a power receiving section to receive the power transmitted from a power sending section (motor generator MG) on the side of the piece 11.

Next, operations of the engagement device 10 according to the first embodiment will be described with reference to FIGS. 2 to 5.

Figure 2:
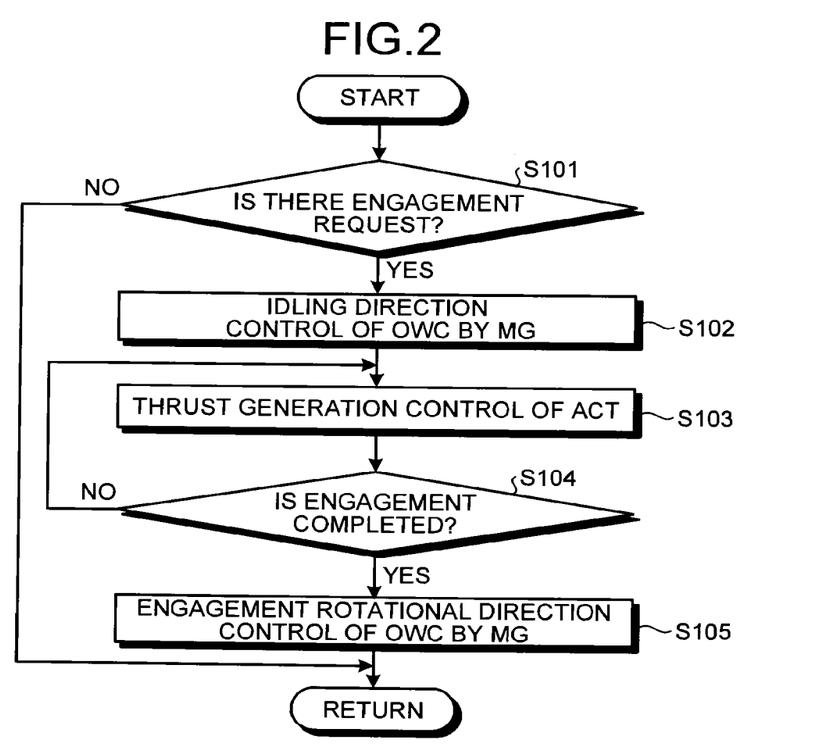
FIG. 2 is a flowchart of engagement control processing performed by the engagement device according to the first embodiment.
Figure 3:
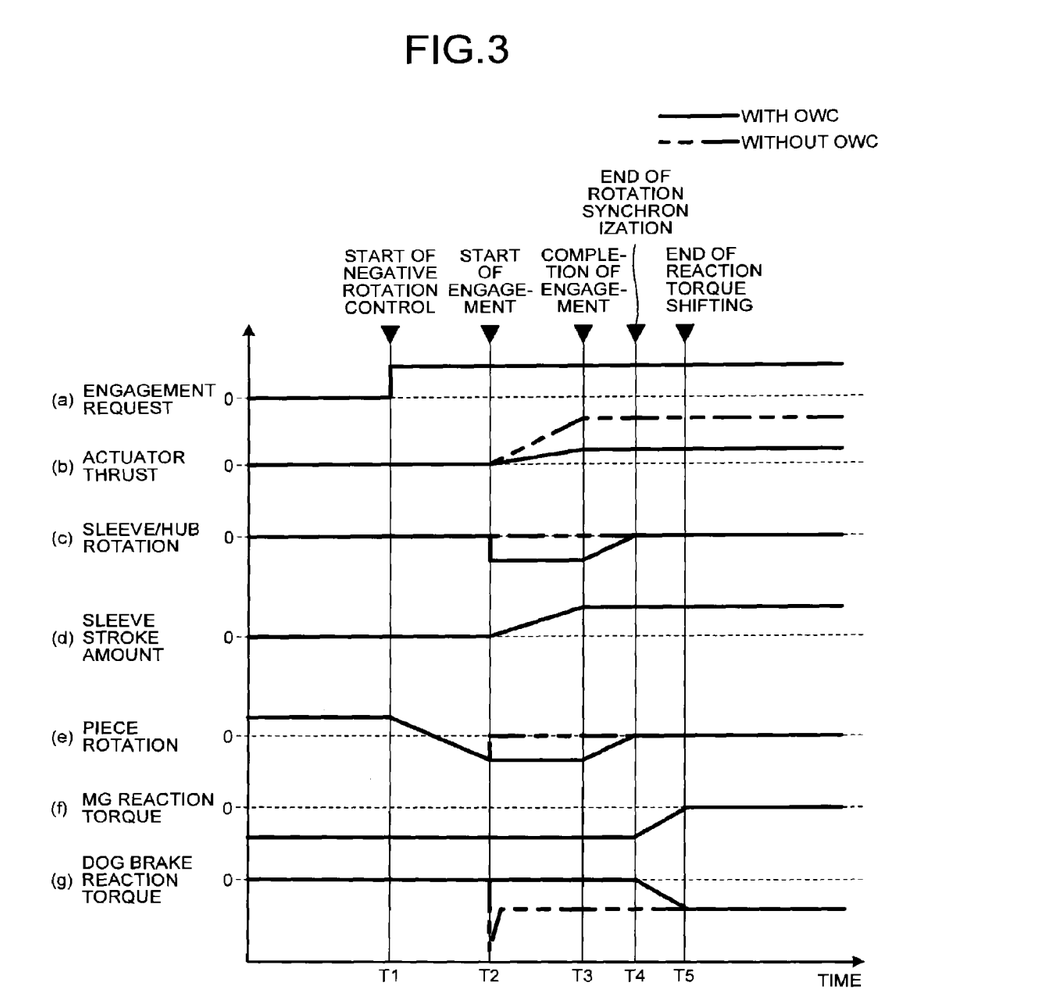
FIG. 3 is a time chart of the engagement control processing performed by the engagement device according to the first embodiment.

First with reference to FIGS. 2 and 3, engagement control processing performed by the engagement device 10 according to the first embodiment will be described. FIG. 2 is a flowchart of the engagement control processing performed by the engagement device according to the first embodiment. FIG. 3 is a time chart of the engagement control processing performed by the engagement device according to the first embodiment. The processing illustrated by the flowchart of FIG. 2 is performed by the ECU 40.

In the time chart of FIG. 3, (a) indicates the presence/absence of an engagement request, (b) indicates the thrust of the actuator 15, (c) indicates the rotational frequency of the sleeve 12 and the hub 13, (d) indicates the stroke amount of the sleeve 12, (e) indicates the rotational frequency of the piece 11, (f) indicates a reaction torque of the motor generator MG (also described simply as MG in the figure), and (g) indicates a reaction torque of a dog brake (engaging portion of the piece 11 and the sleeve 12). In FIG. 3, a value of an engagement request at zero indicates there is no request, and the value rising in a positive direction indicates there is a request. In FIG. 3, when the values of the rotational frequencies of the piece 11, the sleeve 12, and the hub 13 are below zero, it indicates that the piece 11, the sleeve 12, and the hub 13 rotate in the negative rotational direction of the motor generator MG and in the idling direction of the one-way clutch 14. In FIG. 3, when a value of the stroke amount of the sleeve 12 is equal to or below zero, it indicates that the sleeve 12 is disengaged from the piece 11, and that as the value transits in the positive direction, the sleeve 12 shifts in the engaging direction and the engaging portion with the piece 11 increases. In FIG. 3, time transition of each value during engagement operation at the engagement device 10 according to this embodiment is indicated with solid lines. As a comparative example, time transition of each value during engagement operation in a configuration without the one-way clutch 14 is indicated with two-dot chain lines.

The engagement control processing will be described below according to the flowchart of FIG. 2. In step S101, it is confirmed whether there is an engagement request. The ECU 40 determines whether to perform engagement of the engagement device 10 based on the information from various types of sensors in the vehicle, for example, and can put out an engagement-request flag in case of performing engagement. If there is an engagement request, the process proceeds to step S102. If there is no engagement request, the control flow is finished. In the time chart of FIG. 3, as illustrated in (a) of FIG. 3, an engagement request is generated after time T1.

In step S102, idling direction control of the one-way clutch (hereinafter also described as OWC) 14 by the motor generator MG is performed. The motor generator MG controls the rotation of the one-way clutch 14 to change toward the idling direction, that is, the negative rotational direction, and controls the rotational frequency of the piece 11 to become a predetermined negative rotational frequency (this control is also described as negative rotation control). When the rotational frequencies of the motor generator MG and the piece 11 become the predetermined negative rotational frequencies, these rotational frequencies are maintained. When processing in step S102 is completed, the process proceeds to step S103.

In the time chart of FIG. 3, negative rotation control of step S102 is started at time T1, and as illustrated in (e) of FIG. 3, the rotational frequency of the piece 11 starts transition toward the negative rotational direction. At time T2, the rotational frequency of the piece 11 reaches a predetermined negative rotational frequency, and this rotational frequency is maintained after time T2.

In step S103, thrust generation control of the actuator 15 is performed. The actuator 15 controls generation of thrust for shifting the sleeve 12 in the engaging direction. Through this thrust generation control, the sleeve 12 shifts in the engaging direction, and starts engaging with the piece 11.

In the time chart of FIG. 3, at time T2, thrust generation control of the actuator 15 is started, and engagement operation of the sleeve 12 with the piece 11 is started. As indicated with a solid line in (b) of FIG. 3, the thrust of the actuator 15 gradually increases after time T2. Accordingly, as illustrated in (d) of FIG. 3, the stroke amount of the sleeve 12 increases as well. After time T2, the sleeve 12 starts engaging with the piece 11. Therefore, the sleeve 12 receives a rotation torque from the piece 11. This rotation torque is in a negative rotational direction.

Here, a behavior in the configuration without the one-way clutch 14 as a comparative example, indicated with two-dot chain lines in FIG. 3, will be considered. Without the one-way clutch 14 between the sleeve 12 and the base body 32, the sleeve 12 and the hub 13 are restricted from rotating about the rotating shaft 30. In this case, even when the sleeve 12 starts engaging with the piece 11 at time T2 and the rotation torque in the negative direction is transmitted from the piece 11, the sleeve 12 is unable to rotate in the negative direction. Thus, the rotational frequency of the sleeve 12 remains zero, as indicated with a two-dot chain line in (c) of FIG. 3. Therefore, as indicated with a two-dot chain line in (g) of FIG. 3, when engagement operation starts at time T2, a reaction torque relative to the rotation torque of the piece 11 is generated in the negative direction in the engaging portion between the piece 11 and the sleeve 12 (dog brake). As a result, as indicated with a two-dot chain line in (e) of FIG. 3, the rotation of the piece 11 is also stopped at time T2. At this time, the reaction torque is applied to the dog brake. Therefore, it is necessary to push the sleeve 12 on the side of the piece 11 against a friction force generated between the contact tooth surfaces by this reaction torque. Thus, as indicated with a two-dot chain line in (b) of FIG. 3, a relatively large value is required for the thrust of the actuator 15.

On the other hand, in the engagement device 10 of this embodiment, as described above, the one-way clutch 14 is disposed between the sleeve 12 and the base body 32, and the one-way clutch 14 is disposed to idle in the negative rotational direction of the motor generator MG. Thus, as indicated with solid lines in (c) and (e) of FIG. 3, after time T2, the sleeve 12 integrally rotates with the piece 11 by the rotation torque received from the piece 11, and rotates at a predetermined negative rotational frequency identical to the predetermined negative rotational frequency of the piece 11.

In the engagement device 10 of this embodiment, the sleeve 12 integrally rotates with the piece 11 during engagement operation. Therefore, as indicated with a solid line in (g) of FIG. 3, a reaction torque is not generated and power transmission is not performed between tooth surfaces of the dog tooth 12a of the sleeve 12 and the dog tooth 11a of the piece 11, which are the engaging portion between the sleeve 12 and the piece 11. Consequently, compared with a conventional case where engagement operation is performed with a difference in rotational frequency between the piece 11 and sleeve 12, engagement operation is performed with a substantially small friction force generated between the tooth surfaces of the dog tooth 12a of the sleeve 12 and the dog tooth 11a of the piece 11. Due to the smaller effects of the friction force between the tooth surfaces, as indicated with the solid line in (b) of FIG. 3, the actuator thrust required during engagement can be set smaller than before, and the actuator 15 can be miniaturized.

Referring back to FIG. 2, in step S104, it is confirmed whether engagement of the sleeve 12 with the piece 11 is completed. Engagement completion can be determined by measuring the stroke amount of the sleeve 12, for example, to prove that this stroke amount has reached a predetermined level. As a result of the determination of step S104, if engagement is completed, the process proceeds to step S105. If engagement is not completed, the process returns to step S103, and thrust generation control of the actuator 15 and shifting of the sleeve 12 in the engaging direction are continued.

In step S105, engagement rotational direction control of the one-way clutch 14 by the motor generator MG is performed. The motor generator MG controls the rotation of the one-way clutch 14 to change toward the engaging direction, that is, the positive rotational direction, and controls the rotational frequency of the piece to become zero. When processing in step S105 is completed, the control flow is finished.

In the time chart of FIG. 3, at time T3, the stroke amount of the sleeve 12 reaches a predetermined level, and engagement operation is determined to be completed. After time T3, engagement rotational direction control in step S105 is started. As indicated with the solid line in (e) of FIG. 3, the rotational frequency of the piece 11 starts transition toward the positive rotational direction at time T3, and reaches zero at time T4. The rotation of the piece 11 stops after time T4. As illustrated in (c) of FIG. 3, in response to this rotation control of the piece 11, the sleeve 12 integrally rotating with the piece 11 and the hub 13 also start transition in the positive rotational direction at time T3, and stop rotating at time T4. Rotation synchronization between the piece 11, and the sleeve 12 and the hub 13 is finished at time T4.

As illustrated in (f) and (g) of FIG. 3, between time T4 and time T5 after engagement is completed, shifting of the reaction torque from the motor generator MG to the dog brake is performed. Shifting of the reaction torque can be performed by drive control of the motor generator MG such that the reaction torque of the motor generator MG is released. Thus, in the engagement device 10 of this embodiment, torque transmission is performed after a sufficient engagement length is secured between the sleeve 12 and the piece 11.

Figure 4:
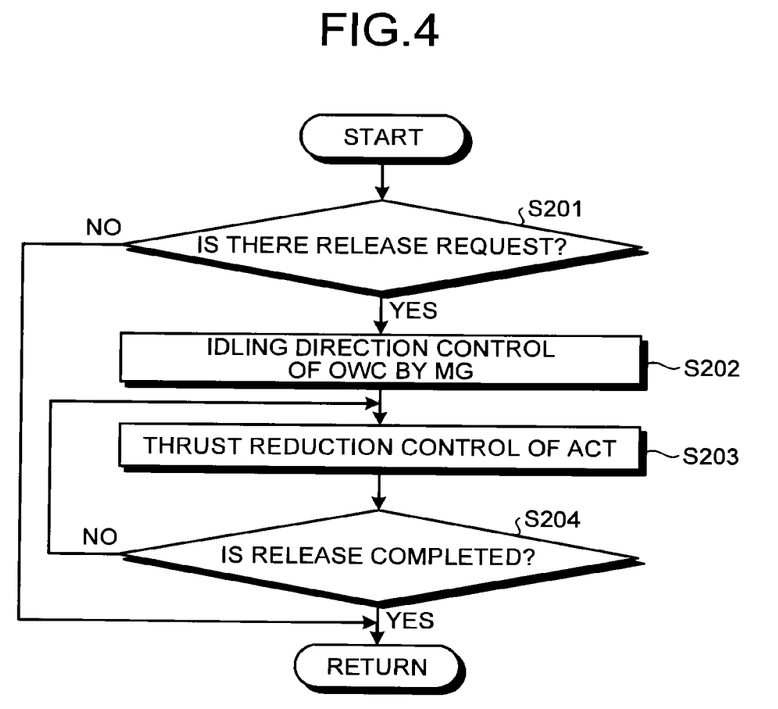
FIG. 4 is a flowchart of release control processing performed by the engagement device according to the first embodiment.
Figure 5:
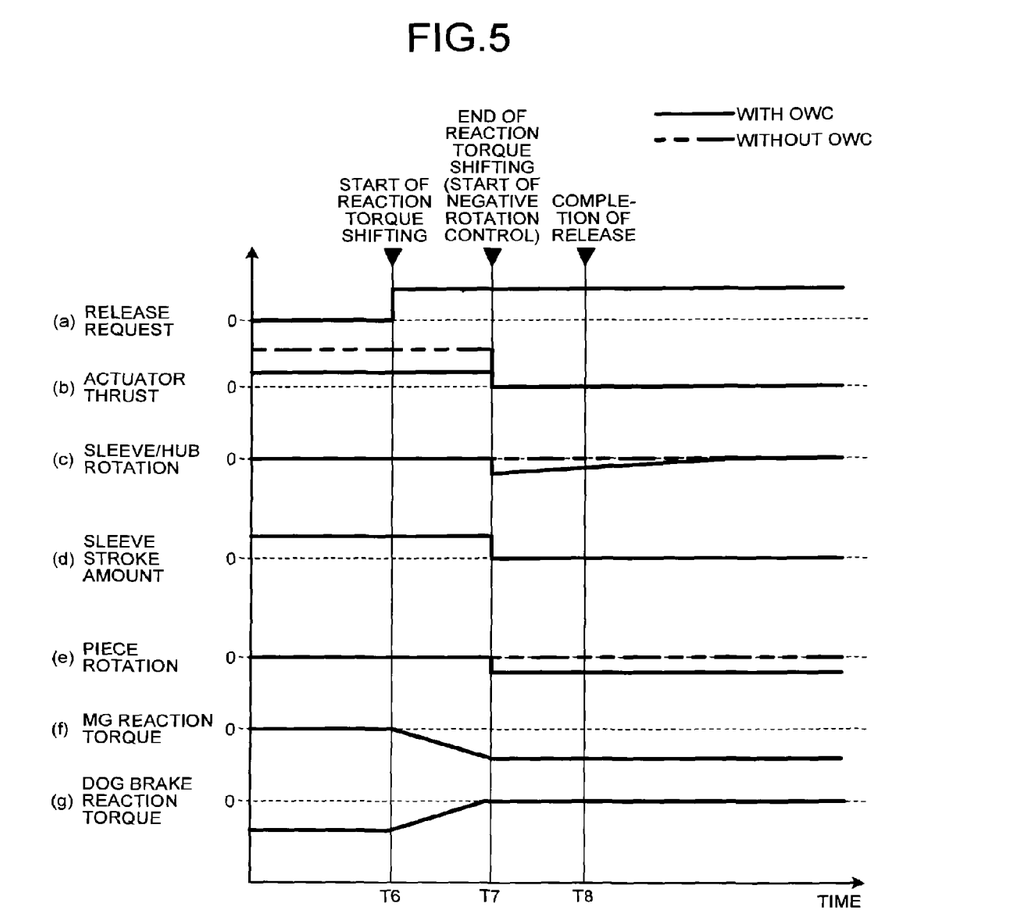
FIG. 5 is a time chart of the release control processing performed by the engagement device according to the first embodiment.

Next, release control processing performed by the engagement device according to the first embodiment will be described with reference to FIGS. 4 and 5. FIG. 4 is a flowchart of the release control processing performed by the engagement device according to the first embodiment. FIG. 5 is a time chart of the release control processing performed by the engagement device according to the first embodiment. The processing in the flowchart illustrated in FIG. 4 is performed by the ECU 40.

In the time chart of FIG. 5, (a) indicates the presence/absence of a release request. In FIG. 5, a value of a release request at zero indicates there is no request, and the value rising in a positive direction indicates there is a request. Other items in the time chart of FIG. 5 are the same as those in the time chart of FIG. 3. Therefore, descriptions will be omitted.

Release control will be described below according to the flowchart of FIG. 4. In step S201, it is confirmed whether there is a release request. The ECU 40 can determine whether to release the engagement device 10 based on information from various types of sensors in the vehicle, for example, and can put out a release-request flag if the release is performed. If there is a release request, the process proceeds to step S202. If there is no release request, the control flow is finished.

In the time chart of FIG. 5, as illustrated in (a) of FIG. 5, a release request is generated after time T6. As illustrated in (f) and (g) of FIG. 5, between time T6 and time T7 before release operation starts, shifting of the reaction torque from the dog brake to the motor generator MG is performed.

In step S202, idling direction control (negative rotation control) of the one-way clutch 14 by the motor generator MG is performed. This negative rotation control is the same as the negative rotation control in step S102 of FIG. 3. When processing in step S202 is completed, the process proceeds to step S203.

In the time chart of FIG. 5, negative rotation control is started at time T7. As illustrated in (e) of FIG. 5, the rotational frequency of the piece 11 is changed to a predetermined negative rotational frequency. Accordingly, the sleeve 12 engaged with the piece 11 receives a rotation torque from the piece 11 in the negative rotational direction. As described above, the one-way clutch 14 disposed between the sleeve 12 and the base body 32 is disposed to idle in the negative rotational direction. Therefore, as indicated with the solid lines in (c) and (e) of FIG. 5, at time T7, the sleeve 12 integrally rotates with the piece 11 by the rotation torque received from the piece 11 and rotates at a predetermined negative rotational frequency identical to the predetermined negative rotational frequency of the piece 11.

In step S203, thrust reduction control of the actuator 15 is performed. The actuator 15 controls the thrust in the engaging direction applied to the sleeve 12 during engagement to be reduced to zero. Through this thrust reduction control, the energizing force applied to the sleeve 12 from the return spring 16 in the release direction shifts the sleeve 12 in the release direction, and starts release operation from engagement with the piece 11.

In step S204, it is confirmed whether release of the sleeve 12 from the piece 11 is completed. Release completion can be determined by measuring the stroke amount of the sleeve 12, for example, to prove that this stroke amount has returned to zero. As a result of the determination of step S204, if release is completed, the control flow is finished. If release is not completed, the process returns to step S203, and thrust reduction control of the actuator 15 and shifting of the sleeve 12 in the release direction are continued.

In the time chart of FIG. 5, at time T7, thrust reduction control of the actuator 15 is started and, as indicated with the solid line in (b) of FIG. 5, the actuator thrust is changed to zero. Accordingly, as illustrated in (d) of FIG. 5, the stroke amount of the sleeve 12 also becomes zero at time T7.

During release operation, the sleeve 12 integrally rotates with the piece 11. Thus, as illustrated in (g) of FIG. 5, a reaction torque is not generated and power transmission is not performed between the tooth surfaces of the dog tooth 12a of the sleeve 12 and the dog tooth 11a of the piece 11. Consequently, compared with a conventional case where release operation is performed with a difference in rotational frequency between the piece 11 and sleeve 12, release operation is performed with a substantially small friction force generated between the tooth surfaces of the dog tooth 12a of the sleeve 12 and the dog tooth 11a of the piece 11. Due to the smaller effects of the friction force between the tooth surfaces, the energizing force of the return spring 16 required during release can be set smaller than before, and the return spring 16 can be miniaturized. After time T7, even after being completely released from the piece 11, the sleeve 12 rotates inertially for a while by the rotation torque received from the piece 11 during release operation, and stops rotating in due course. In the time chart of FIG. 5, release completion of step S204 is determined at time T8.

Next, effects of the engagement device 10 according to the first embodiment will be described.

The engagement device 10 of this embodiment includes the piece 11, the sleeve 12, a control unit (motor generator MG, actuator 15, return spring 16, and ECU 40), and the one-way clutch 14. The piece 11 is disposed rotatably about the rotating shaft 30 and rotates in conjunction the rotating shaft 30. The sleeve 12 is disposed coaxially with the piece 11, and performs engagement with the piece 11 and release of the engagement with the piece 11 by shifting in the axial direction. The control unit controls the rotation of the piece 11 and the shifting of the sleeve 12 in the axial direction. The one-way clutch 14 is disposed on the power transmission path from the rotating shaft 30 toward the base body 32 coupled to the sleeve 12. The ECU 40 rotates the piece 11 in the idling direction of the one-way clutch 14 when performing engagement or release of the sleeve 12 with or from the piece 11.

With this configuration, when the sleeve 12 engages with/releases from the piece 11, there is no difference in rotational frequency therebetween, and power transmission is not performed between the dog teeth 11a and 12a, which are the contact portions of the piece 11 and the sleeve 12. Therefore, durability of the dog teeth 11a and 12a can be improved, and durability of the engagement device 10 can be improved. When the sleeve 12 engages with/releases from the piece 11, a reaction torque is not generated between the dog teeth 11a and 12a. Thus, effects of the friction force between the tooth surfaces are reduced, and the thrust required during engagement/release can be set smaller. This allows the miniaturization of the actuator 15 and the return spring 16 which are driving sources for shifting of the sleeve 12 in the axial direction, and the size of the engagement device 10 can be reduced.

In the engagement device 10 of this embodiment, the piece 11 and the sleeve 12 constitute a dog clutch. With this configuration, power transmission can suitably be performed from the power sending side (motor generator MG) to the power receiving side (base body 32) without causing a dragging loss in the engaging portion.

In the engagement device 10 of this embodiment, the one-way clutch 14 is disposed on the side of the base body 32 away from the sleeve 12 on the power transmission path. With this configuration, when the engagement device 10 is released, the rotating shaft 30 can be rotated without being affected by the inertia of the one-way clutch 14.

In the first embodiment, a configuration is exemplified, where the dog tooth 11a of the piece 11 protrudes outward in the radial direction and the dog tooth 12a of the sleeve 12 protrudes inward from outside the piece 11 in the radial direction. However, the tooth positions of the piece 11 and the sleeve 12 may be different. For example, in an aspect, the dog tooth 11a of the piece 11 and the dog tooth 12a of the sleeve 12 may protrude toward each other.

In the first embodiment, a configuration is exemplified, where the engagement device 10 serves as a dog clutch for engaging/releasing the dog tooth 12a of the sleeve 12 with/from the dog tooth 11a of the piece 11. However, other engaging elements such as a multiple wet clutch in an AT may be substituted.

Furthermore, in the first embodiment, a configuration is exemplified, where the one-way clutch 14 is disposed between the hub 13 and the base body 32. However, the one-way clutch 14 may be disposed between the piece 11 and the rotating shaft 30 instead of the above configuration, as long as the one-way clutch 14 is disposed on the power transmission path from the power sending section (motor generator MG) on the side of the piece 11 to the power receiving section (base body 32) on the side of the sleeve 12.

[Second Embodiment]

Figure 6:
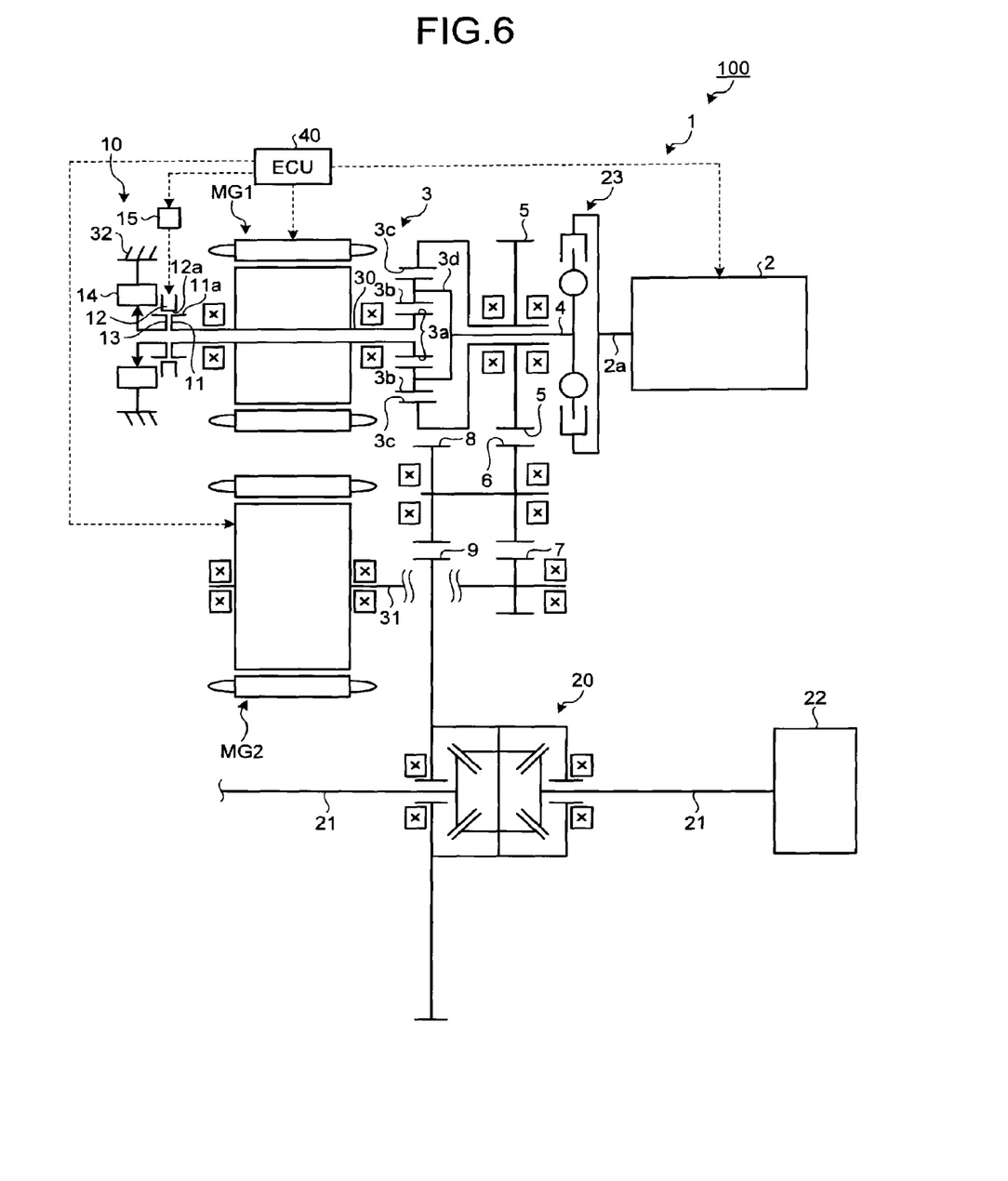
FIG. 6 is a skeleton diagram of a power transmission device of a hybrid vehicle applying an engagement device according to a second embodiment of the present invention.
Figure 7:
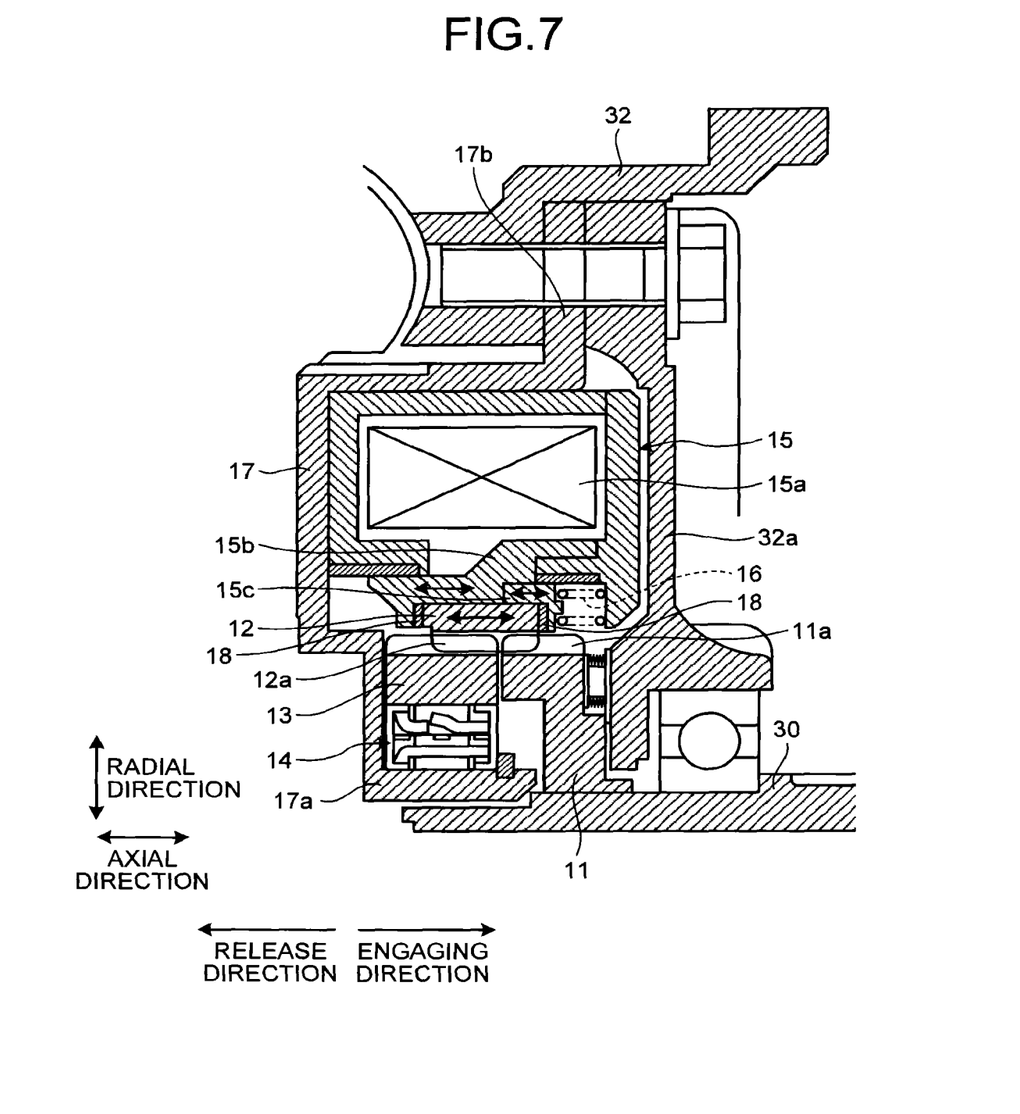
FIG. 7 is an enlarged longitudinal sectional view of a main section of the engagement device of the power transmission device of FIG. 6.

The second embodiment will be described with reference to FIGS. 6 to 9. First, configurations of an engagement device 10 and a power transmission device 1 according to the second embodiment will be described with reference to FIGS. 6 and 7. FIG. 6 is a skeleton diagram of a power transmission device of a hybrid vehicle where the engagement device according to the second embodiment of the present invention is applied. FIG. 7 is an enlarged longitudinal sectional view of a main section of the engagement device of the power transmission device of FIG. 6.

As illustrated in FIG. 6, the engagement device 10 in the second embodiment is applied to the power transmission device 1 mounted on a hybrid vehicle 100. The hybrid vehicle 100 has an engine 2, a first rotating machine MG1, and a second rotating machine MG2 as power sources.

The power transmission device 1 includes the engine 2, a planetary gear mechanism 3, the first rotating machine MG1, the second rotating machine MG2, and the engagement device 10. The power transmission device 1 is applicable to front-engine front-wheel drive (FF) vehicles, rear-engine rear-wheel drive (RR) vehicles, or the like. The power transmission device 1 is mounted on the vehicle 100 such that the axial direction becomes a vehicle width direction, for example.

The engine 2 converts combustion energy of fuel into a rotating motion of a rotating shaft 2a to output in accordance with a control command from an ECU 40. The rotating shaft 2a of the engine 2 is coupled to an input shaft 4 via a damper 23. The rotating shaft 2a of the engine 2 and the input shaft 4 are coaxially disposed. The input shaft 4 is connected to a carrier 3d of the planetary gear mechanism 3.

The planetary gear mechanism 3 has a function as a power distribution mechanism to distribute the power from the engine 2 to the output side and the first rotating machine MG1. The planetary gear mechanism 3 has a sun gear 3a, a pinion gear 3b, a ring gear 3c, and the carrier 3d. The sun gear 3a is disposed outside the input shaft 4 in a radial direction. The sun gear 3a is disposed rotatably and coaxially with the input shaft 4. The ring gear 3c is disposed outside the sun gear 3a in the radial direction, and is disposed rotatably and coaxially with the sun gear 3a. The pinion gear 3b is disposed between the sun gear 3a and the ring gear 3c, and is engaged with each of the sun gear 3a and the ring gear 3c. The pinion gear 3b is rotatably supported by the carrier 3d that is disposed coaxially with the input shaft 4.

The carrier 3d is connected to the input shaft 4, and integrally rotates with the input shaft 4. Thus, the pinion gear 3b is rotatable (revolvable) about a central axial line of the input shaft 4, and is rotatable (revolvable) about a central axial line of the pinion gear 3b by being supported by the carrier 3d.

The first rotating machine MG1 is connected to the sun gear 3a. A rotating shaft 30 of the first rotating machine MG1 is disposed coaxially with the input shaft 4 and connected to the sun gear 3a. Thus, a rotor of the first rotating machine MG1 integrally rotates with the sun gear 3a. As illustrated in FIG. 7, the rotating shaft 30 of the first rotating machine MG1 is supported by a supporting member 32a extending to the rotating shaft 30 from the inner surface of a housing 32 that includes the power transmission device 1.

A counter driving gear 5 is connected to the ring gear 3c. The counter driving gear 5 is an output gear which integrally rotates with the ring gear 3c. The counter driving gear 5 is disposed closer to the side of the engine 2 than the ring gear 3c in an axial direction. The ring gear 3c is also an output element that can output rotation input from the first rotating machine MG1 or the engine 2 to the side of a driving wheel 22.

The counter driving gear 5 is engaged with a counter driven gear 6. A reduction gear 7 of the second rotating machine MG2 is engaged with the counter driven gear 6. The reduction gear 7 is disposed on a rotating shaft 31 of the second rotating machine MG2 and integrally rotates with the rotating shaft 31. That is, a torque output by the second rotating machine MG2 is transmitted to the counter driven gear 6 via the reduction gear 7. The reduction gear 7 has a smaller diameter than the counter driven gear 6, and decelerates rotation of the second rotating machine MG2 to transmit to the counter driven gear 6.

The first rotating machine MG1 and the second rotating machine MG2 are coupled to a battery (not illustrated) via an inverter. The first rotating machine MG1 and the second rotating machine MG2 can function as an electric motor that converts electric power supplied from the battery into mechanical power to output in accordance with a control command from the ECU 40, and also as a generator that converts mechanical power into electric power by being driven by the power input. Electric power generated by the first rotating machine MG1 and the second rotating machine MG2 can be stored in the battery. An AC synchronous type motor generator, for example, may be used as the first rotating machine MG1 and the second rotating machine MG2.

A drive pinion gear 8 is connected to the counter driven gear 6. The drive pinion gear 8 is disposed coaxially with the counter driven gear 6 and integrally rotates with the counter driven gear 6. The drive pinion gear 8 is engaged with a differential ring gear 9 of a differential device 20. The differential device 20 is coupled to the driving wheel 22 via right and left driving shafts 21. That is, the ring gear 3c is coupled to the driving wheel 22 via the counter driving gear 5, the counter driven gear 6, the drive pinion gear 8, the differential device 20, and the driving shaft 21. The second rotating machine MG2 is disposed closer to the side of the driving wheel 22 than the ring gear 3c, is connected on a power transmission path between the ring gear 3c and the driving wheel 22, and can transmit power to each of the ring gear 3c and the driving wheel 22.

An engine torque output from the engine 2 is transmitted to a pair of driving wheels 22 via the planetary gear mechanism 3 as a power distribution mechanism and the differential device 20. When functioning as a generator, the first rotating machine MG1 regenerates electric power by the engine torque distributed and supplied at the planetary gear mechanism 3. The planetary gear mechanism 3 is used as a continuously variable transmission by allowing the first rotating machine MG1 to function as a generator and controlling regeneration. In other words, output of the engine 2 is transmitted to the driving wheel 22 after gear shifting by the planetary gear mechanism 3. By drive control of the second rotating machine MG2, or rotational frequency control of the first rotating machine MG1 or the second rotating machine MG2, engine rotational frequency control of the engine 2 and output control to the driving wheel 22 can be performed.

In the vehicle 100 of this embodiment, as illustrated in FIG. 6, the first rotating machine MG1 is disposed coaxially with the rotating shaft 2a of the engine 2. The second rotating machine MG2 is disposed on the rotating shaft 31 which is different from the rotating shaft 2a of the engine 2. That is, the power transmission device 1 of this embodiment is of a pluriaxial type with the input shaft 4 and the rotating shaft 31 of the second rotating machine MG2 disposed on different axes.

In the power transmission device 1 of this embodiment, the planetary gear mechanism 3 is disposed, between the engine 2 and the first rotating machine MG1, coaxially with the rotating shaft 2a of the engine 2. The engagement device 10 is disposed on the side opposite to the engine 2 across the first rotating machine MG1. That is, in the power transmission device 1 of this embodiment, the counter driving gear 5, the planetary gear mechanism 3, the first rotating machine MG1, and the engagement device 10, in order from the side of the engine 2, are disposed coaxially with the rotating shaft 2*a* of the engine 2.

As illustrated in FIG. 6, the engagement device 10 is coupled to the first rotating machine MG1. In this embodiment, the engagement device 10 is configured to restrict the rotation of the first rotating machine MG1, and is used as a MG1 lock mechanism that mechanically locks the rotation of the first rotating machine MG1. In other words, the first rotating machine MG1 in the second embodiment is equivalent to the motor generator MG in the first embodiment, and the rotating shaft 30 of the first rotating machine MG1 in the second embodiment is equivalent to the rotating shaft 30 of the motor generator MG in the first embodiment. The housing 32 in the second embodiment is equivalent to the base body 32 in the first embodiment.

When it is necessary to control the rotational frequency of the first rotating machine MG1 at zero at the time of controlling engine rotational frequency or controlling output to the driving wheel by the power transmission device 1, the rotation of the first rotating machine MG1 is mechanically locked by the engagement device 10. Thus, there is no need to electrically control the rotational frequency of the first rotating machine MG1. Therefore, it is not necessary to supply electric power to the first rotating machine MG1, and fuel efficiency can be improved. By mechanically locking the rotation of the first rotating machine MG1 by the engagement device 10, the planetary gear mechanism 3 ceases to function as a continuously variable transmission and becomes a fixed stage.

When the engagement device 10 is thus used as a MG1 lock mechanism, the engagement device 10 can be configured as illustrated in FIG. 7, for example.

A piece 11 is disposed around the rotating shaft 30 of the first rotating machine MG1, and fixed on the spline around the outer peripheral surface of the rotating shaft 30. Like the piece 11, the sleeve 12 is disposed around the rotating shaft 30 of the first rotating machine MG1, and is disposed outside the piece 11 in the radial direction. The sleeve 12 is spline-fitted into the outer peripheral surface of a hub 13, and configured to be shiftable on the outer peripheral surface of the hub 13 in the axial direction.

By the shifting of the sleeve 12 in the axial direction, a dog tooth 12*a* of the sleeve 12 becomes engaged with a dog tooth 11*a* of the piece 11. As a result, the engagement device 10 is engaged, and the rotation of the first rotating machine MG1 can be fixed.

The hub 13 is disposed adjacent to the piece 11 on the side of the release direction. The hub 13 is disposed inside the sleeve 12 in the radial direction, and spline-fits the sleeve 12 on the outer peripheral surface, as described above. A one-way clutch 14 is disposed inside the hub 13 in the radial direction. During engagement of the engagement device 10, the one-way clutch 14 is disposed to engage when the rotating shaft 30 rotates in the positive rotational direction of the first rotating machine MG1. The one-way clutch 14 is also disposed such that the idling direction thereof becomes the negative rotational direction of the first rotating machine MG1.

An actuator 15 is disposed outside the piece 11, the sleeve 12, the hub 13, and the one-way clutch 14 in the radial direction. That is, the piece 11, the sleeve 12, the hub 13, and the one-way clutch 14 are disposed on the inner circumferential side of the actuator and within a range of an axial length of the actuator, and configured to shorten the overall axial length of the engagement device 10.

The actuator 15 of this embodiment is a solenoid type electromagnetic actuator. As illustrated in FIG. 7, the actuator 15 includes an electromagnetic coil 15*a* and an armature 15*b* as a target to be driven, fitted into the inner circumferential side of the electromagnetic coil 15*a*. The armature 15*b* is shiftably disposed along the axial direction. Along with the shifting of the armature 15*b* toward the first rotating machine MG1 in the axial direction, a pressing force is transmitted to the sleeve 12 in an engaging direction. As a result, the sleeve 12 can shift in the engaging direction in conjunction with the armature 15*b*.

A plunger 15*c* is shiftably disposed in the axial direction on the side of the first rotating machine MG1 (right-hand side in FIG. 7) from the armature 15*b* and the sleeve 12 in the axial direction. The plunger 15*c* is disposed abuttably and in a non-connected condition with each of the armature 15*b* and the sleeve 12. In the plunger 15*c*, a return spring 16 is also attached to an end opposing the armature 15*b* and the sleeve 12 and to the opposite side (side of the first rotating machine MG1). The return spring 16 is a compressed spring, for example, and held in an appropriately compressed condition. The closer the plunger 15*c* shifts toward the first rotating machine MG1, that is, the deeper the sleeve 12 engages with the piece 11, the larger the return spring 16 generates an energizing force on the opposite side of the shifting direction of the plunger 15*c*.

The sleeve 12 is configured to receive the energizing force from the return spring 16 through this plunger 15*c*. A thrust washer 18 is disposed in a contact portion where the sleeve 12 receives the energizing force from the plunger 15*c*. Similarly in a contact portion where the sleeve 12 receives axial thrust from the armature 15*b*, the thrust washer 18 is disposed. The lubricating performance of these thrust washers 18 allows the sleeve 12 to rotate, about the rotating shaft 30, relatively to the armature 15*b* and the plunger 15*c*.

When the engagement device 10 is released, the actuator 15 is stopped and the sleeve 12 receives the energizing force of the return spring 16 in a release direction (left-hand side in FIG. 7) through the plunger 15*c*. By this energizing force, the sleeve 12 is held on the hub 13 separated from the piece 11, and disengaged from the piece 11 The piece 11 can rotate in conjunction with the rotating shaft 30 of the first rotating machine MG1.

When a current flows in the electromagnetic coil 15*a* in accordance with a control command from the ECU 40, a magnetic flux flows through a magnetic path around the electromagnetic coil 15*a*, and a force to shift the armature 15*b* in the engaging direction (right-hand side in FIG. 7) is generated. Along with the shifting of the armature 15*b*, the sleeve 12 receives a trust and shifts in the engaging direction closer to the piece 11. As a result, the dog tooth 12*a* of the sleeve 12 is engaged with the dog tooth 11*a* of the piece 11, and the engagement device 10 becomes engaged.

The components of the engagement device 10 are housed in a space formed by the housing 32, the supporting member 32*a*, and the circumferential surface of the rotating shaft 30, and are covered with a cover member 17 from the side of the release direction in the axial direction (left-hand side in FIG. 7). The cover member 17 has, around the rotating shaft 30, an inner cylinder portion 17*a* extending adjacent to the piece 11. The cover member 17 has a shape extending from this inner cylinder portion 17*a* outward in the radial direction along the shapes of the one-way clutch 14 and the actuator 15, and is fastened with a bolt to the housing 32 as well as the supporting member 32*a* at an outer end edge 17*b*. That is, the cover member 17 also functions as a connecting member for connecting the one-way clutch 14 and the housing 32.

As illustrated in FIG. 7, the engagement device 10 of this embodiment is configured to integrate an outer race of the one-way clutch 14 with the hub 13, and further integrate an inner race of the one-way clutch 14 with the inner cylinder portion 17a of the cover member 17. This allows a reduction in the number of parts and miniaturization of the engagement device 10.

Next, operations of the engagement device 10 and the power transmission device 1 according to the second embodiment will be described with reference to FIGS. 8 and 9.

The power transmission device 1 of this embodiment can perform an MG1 lock function for restricting the rotation of the first rotating machine MG1, by making the engagement device 10 engaged. Here in this embodiment, the one-way clutch 14 of the engagement device 10 is disposed to idle in the negative rotational direction of the first rotating machine MG1. Therefore, the engagement device 10 is rotatable in the negative rotational direction even in an engaged condition. In other words, even while the MG1 lock function is performed, a torque in the negative direction is input into the first rotating machine MG1, when the engine 2 is driven. Therefore, the one-way clutch 14 may idle. In this case, the rotating shaft 30 of the first rotating machine MG1 also rotates negatively. Therefore, the first rotating machine MG1 is unable to receive an engine braking reaction force, and as a result, unable to transmit a driven torque (engine braking) toward the output shaft side (driving shaft 21).

Thus, the power transmission device 1 of this embodiment is configured to perform pressing torque control of the one-way clutch 14 in a case where the MG1 locking is performed upon an engine braking request. The "pressing torque control" is control for generating a torque such that the one-way clutch 14 is pressed in the engaging direction by controlling the first rotating machine MG1. By this pressing torque control, idling of the one-way clutch 14 and the first rotating machine MG1 can be suppressed and the first rotating machine MG1 can receive the engine braking reaction force, even while the MG1 lock function is performed and when the engine 2 is driven.

The pressing torque control will be described with reference to FIGS. 8 and 9. FIG. 8 is a flowchart of the pressing torque control performed by the power transmission device according to the second embodiment. FIG. 9 is a time chart of the pressing torque control performed by the power transmission device according to the second embodiment.

Figure 8:
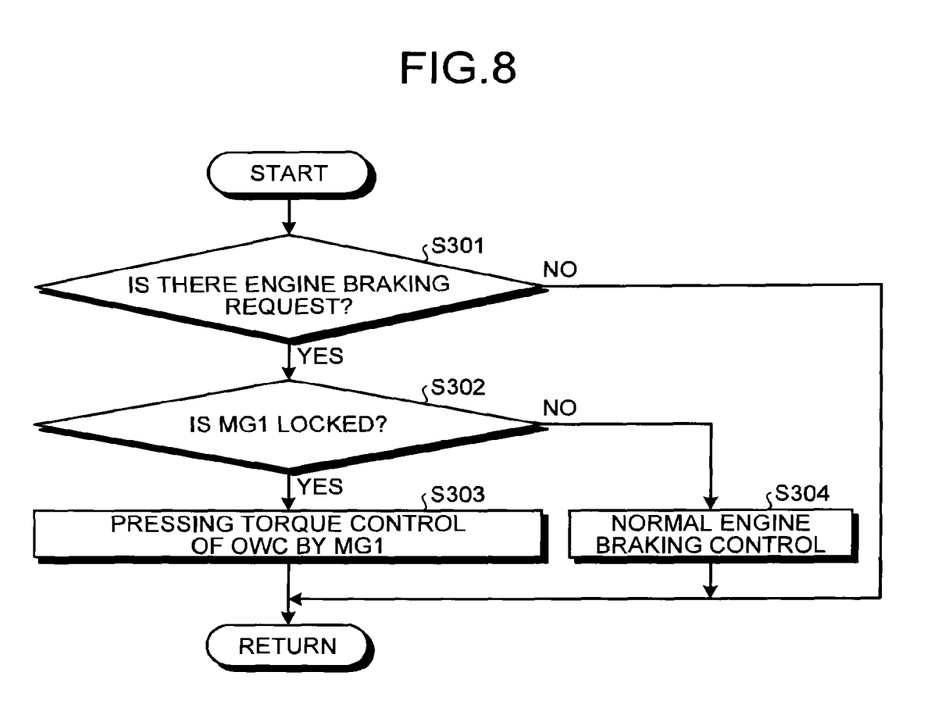
FIG. 8 is a flowchart of pressing torque control performed by the power transmission device according to the second embodiment.

Processing of the flowchart illustrated in FIG. 8 is performed by the ECU 40. In the time chart of FIG. 9, (a) indicates the rotational frequency of the engine 2 (ENG), (b) indicates the output torque of the engine 2, (c) indicates the rotational frequency of the first rotating machine MG1 (also described simply as MG1 in the figure), (d) indicates the torque of the first rotating machine MG1, (e) indicates the rotational frequency of the output shaft (driving shaft 21), and (f) indicates the torque of the output shaft. In FIG. 9, time transition of each value during the pressing torque control in the power transmission device 1 of this embodiment is indicated with solid lines. As a comparative example, time transition of each value without the pressing torque control is indicated with two-dot chain lines. In the time chart of FIG. 9, as a premise, the MG1 locking function is being performed, and the first rotating machine MG1 is coupled to the one-way clutch 14 (also described as OWC in the figure) of the engagement device 10.

The pressing torque control will be described below according to the flowchart of FIG. 8. In step S301, it is confirmed whether there is an engine braking request. The ECU 40 can detect a request for engine baking by detecting accelerator off operation of a driver, for example. If there is an engine braking request, the process proceeds to step S302. Otherwise, the control flow is finished. In the time chart of FIG. 9, accelerator off operation is detected at time T9, and it is determined that there is an engine braking request after time T9.

In step S302, it is confirmed whether MG1 is locked. If MG1 is locked, the process proceeds to step S303. Otherwise, the process proceeds to step S304. In the time chart of FIG. 9, as mentioned above, it is assumed that the MG1 is locked. Thus, the piece 11 and the sleeve 12 are engaged and the first rotating machine MG1 is coupled to the one-way clutch 14. Therefore, as illustrated in (c) of FIG. 9, the rotations of the first rotating machine MG1 and the one-way clutch 14 are synchronized.

In step S303, if there is an engine braking request and MG1 is locked, pressing torque control of the one-way clutch 14 by the first rotating machine MG1 is performed. In the pressing torque control, the first rotating machine MG1 outputs torque in the positive rotational direction. By this torque, the one-way clutch 14 is pressed in the engaging direction and suppressed from idling. When processing in step S303 is completed, the control flow is finished.

Figure 9:
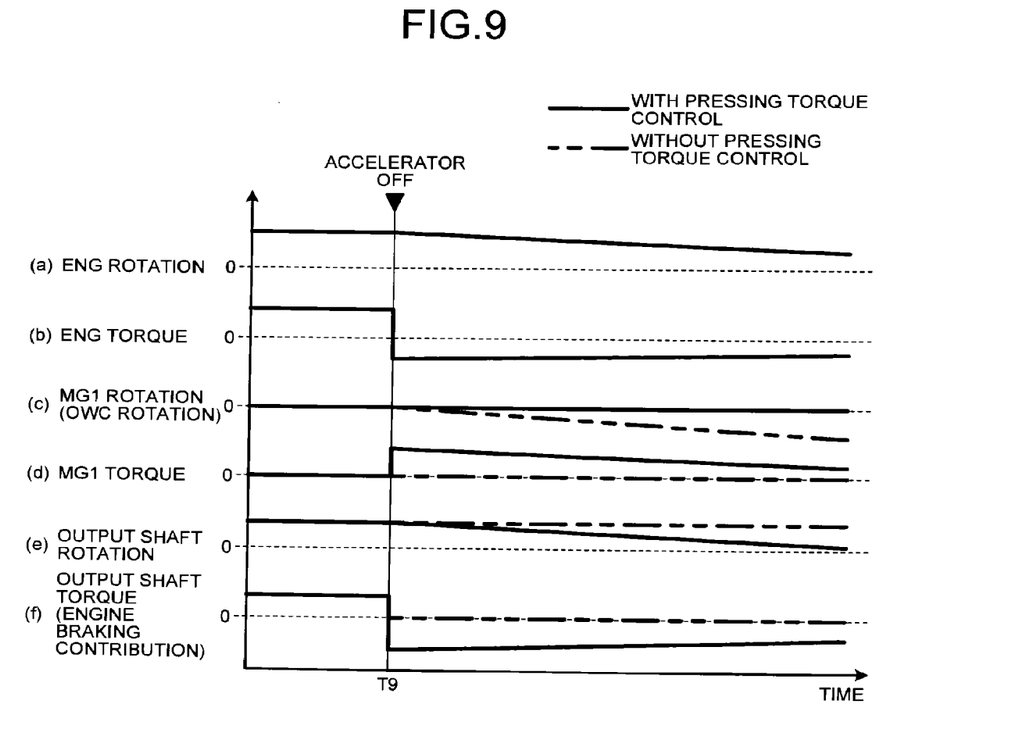
FIG. 9 is a time chart of the pressing torque control performed by the power transmission device according to the second embodiment.

In the time chart of FIG. 9, at time T9, as illustrated in (b), the engine torque reverses toward the negative direction and an engine braking force is generated in response to the accelerator off operation.

Here, as indicated with a two-dot chain line in FIG. 9, transition without the pressing torque control will be described. As described above, the first rotating machine MG1 is coupled to the one-way clutch 14. Therefore, when the engine braking force is transmitted to the first rotating machine MG1, the first rotating machine MG1 idles in the negative rotational direction with the one-way clutch 14, as illustrated in (c) of FIG. 9. The first rotating machine MG1 is idling, and thus cannot receive the engine braking reaction force. Therefore, the engine braking force (driven torque) is not transmitted to the output shaft (driving shaft 21), and as indicated with two-dot chain lines in (e) and (f) of FIG. 9, the torque of the output shaft becomes zero and the rotational frequency does not change, either after the accelerator off operation at time T9. That is, the vehicle is not decelerated by engine braking.

On the other hand, in this embodiment, the pressing torque control is started simultaneously with an engine braking request at time T9. Thus, as indicated with a solid line in (d) of FIG. 9, the first rotating machine MG1 outputs torque in the positive direction at time T9. At this time, the torque is applied to the one-way clutch 14 as well in the positive direction and the engaged condition is maintained. Therefore, idling of the one-way clutch 14 is suppressed. Accordingly, as indicated with a solid line in (c) of FIG. 9, the first rotating machine MG1 is also suppressed from idling and can remain unrotated. Therefore, the first rotating machine MG1 can receive the engine braking reaction force. Consequently, as indicated with a solid line in (f) of FIG. 9, the engine braking force (driven torque) is transmitted to the output shaft (driving shaft 21) after time T9, and as indicated with a solid line in (e) of FIG. 9, the rotational frequency of the output shaft is reduced and the vehicle is decelerated by engine braking.

Referring back to FIG. 8, in step S304, if there is an engine braking request and MG1 is not locked, the engine braking force is controlled normally. This is because, in this case, the engagement device 10 is released and the first rotating machine MG1 is not coupled to the one-way clutch 14, and thus the first rotating machine MG1 can constantly receive the engine braking reaction force. When processing in step S304 is completed, the control flow is finished.

Next, effects of the engagement device 10 and the power transmission device 1 according to the second embodiment will be described.

The engagement device 10 of this embodiment includes the hub 13, the cover member 17, and the actuator 15. The hub 13 couples the sleeve 12 to the one-way clutch 14. The cover member 17 connects the one-way clutch 14 and the housing 32. The actuator 15 drives the sleeve 12. In the engagement device 10, the piece 11, the sleeve 12, the hub 13, and the one-way clutch 14 are disposed on the inner circumferential side of the actuator 15, and the sleeve 12, the hub 13, and the one-way clutch 14 are disposed in that order from outside to inside in the radial direction. The outer race of the one-way clutch 14 is integrated with the hub 13, and the inner race of the one-way clutch 14 is integrated with the cover member 17.

With this configuration, the overall length of the engagement device 10 in the axial direction can be shortened, and the number of components can be reduced. Thus, the engagement device 10 can be miniaturized, and mountability thereof can be improved.

In the power transmission device 1 of this embodiment, the piece 11 of the engagement device 10 is connected to the rotating shaft 30 of the first rotating machine MG1, and the one-way clutch 14 of the engagement device 10 is disposed to idle in the negative rotational direction of the first rotating machine MG1. The ECU 40 can perform the MG1 lock function for restricting the rotation of the first rotating machine MG1 by engaging the piece 11 with the sleeve 12. While the MG1 lock function is performed and when there is an engine braking request, the ECU 40 performs the pressing torque control for suppressing the idling of the one-way clutch 14, by controlling the rotation of the piece 11 and generating torque in the engaging direction of the one-way clutch 14.

With this configuration, even when the engine 2 is driven, idling of the one-way clutch 14 of the engagement device 10 can be suppressed. Thus, the engine braking reaction force can be received at the first rotating machine MG1, and the driven torque can be transmitted to the output shaft (driving shaft 21).

In the second embodiment, a configuration is exemplified, where the engagement device 10 according to this invention is applied as an MG1 lock mechanism for mechanically locking the rotation of the first rotating machine MG1. However, the engagement device 10 according to this invention can also be applied as an engaging element and a brake element regarding other elements in the power transmission device 1, such as overdrive lock, engine directly transmitted shaft shift transmission, and engine shaft disconnection, or as an element to separate the power transmission path.

The embodiments of this invention have been described above, but the embodiments are presented as examples and not intended to limit the scope of the invention. The embodiments can be implemented in other various forms, and various types of omissions, substitutions, or changes can be made without departing from the spirit of the invention. The embodiments and their modifications, as would fall within the scope and spirit of the invention, are included in the invention provided in the claims and the scope of equivalents thereof.

REFERENCE SIGNS LIST

1 POWER TRANSMISSION DEVICE
2 ENGINE
3 PLANETARY GEAR MECHANISM
10 ENGAGEMENT DEVICE
30 ROTATING SHAFT
11 PIECE (ENGAGED PORTION)
12 SLEEVE (ENGAGING PORTION)
13 HUB
14 ONE-WAY CLUTCH
15 ACTUATOR (CONTROL UNIT)
16 RETURN SPRING (CONTROL UNIT)
17 COVER MEMBER (CONNECTING MEMBER)
32 BASE BODY, HOUSING (COUPLING MEMBER)
40 ECU (CONTROL UNIT)
22 DRIVING WHEEL
MG MOTOR GENERATOR (CONTROL UNIT)
MG1 FIRST ROTATING MACHINE (CONTROL UNIT)

The invention claimed is:

1. An engagement device comprising:
an engaged portion disposed rotatably about a rotating shaft and configured to rotate in conjunction with the rotating shaft;
an engaging portion disposed coaxially with the engaged portion and configured to perform engagement with the engaged portion and release from the engagement with the engaged portion by shifting in an axial direction;
a control unit configured to control rotation of the engaged portion and shifting of the engaging portion in the axial direction; and
a one-way clutch disposed on a power transmission path from the rotating shaft to a coupling member coupled to the engaging portion,
wherein the control unit is configured to rotate the engaged portion in an idling direction of the one-way clutch at a time of performing engagement or release of the engaging portion with or from the engaged portion.

2. The engagement device according to claim 1, wherein the engaging portion and the engaged portion constitute a dog clutch.

3. The engagement device according to claim 1, wherein the one-way clutch is disposed closer to the coupling member than the engaging portion is to the coupling member on the power transmission path.

4. The engagement device according to claim 3, comprising:
a hub configured to couple the engaging portion to the one-way clutch; and
a connecting member configured to connect the one-way clutch to the coupling member,
wherein the control unit includes a driving source configured to drive the engaging portion,
the engaging portion, the engaged portion, the hub, and the one-way clutch are disposed on an inner circumferential side of the driving source,
the engaging portion, the hub, and the one-way clutch are disposed in this order from outside to inside in a radial direction,
an outer race of the one-way clutch is integrated with the hub, and
an inner race of the one-way clutch is integrated with the connecting member.

5. A power transmission device comprising:
an engagement device provided on a power transmission path from a power source to a driving wheel, the engagement device including:
- an engaged portion disposed rotatably about a rotating shaft and configured to rotate in conjunction with the rotating shaft;
- an engaging portion disposed coaxially with the engaged portion and configured to perform engagement with the engaged portion and release from the engagement with the engaged portion by shifting in an axial direction;
- a control unit configured to control rotation of the engaged portion and shifting of the engaging portion in the axial direction; and
- a one-way clutch disposed on a power transmission path from the rotating shaft to a coupling member coupled to the engaging portion, wherein the control unit is configured to rotate the engaged portion in an idling direction of the one-way clutch at a time of performing engagement or release of the engaging portion with or from the engaged portion.

6. The power transmission device according to claim 5, comprising:
an engine;
a first rotating machine;
a power distribution mechanism connected to the engine and the first rotating machine and configured to distribute power of the engine to the driving wheel and the first rotating machine; and
a second rotating machine connected to the driving wheel,
wherein the engaged portion of the engagement device is coupled to a rotating shaft of the first rotating machine,
the one-way clutch of the engagement device is disposed to idle in a negative rotational direction of the first rotating machine,
the control unit of the engagement device is configured to perform control for restricting rotation of the first rotating machine by engaging the engaging portion with the engaged portion, and
the one-way clutch is suppressed from idling by controlling rotation of the engaged portion and generating a torque in an engaging direction of the one-way clutch, while the control is performed and when there is an engine braking request.

7. The power transmission device according to claim 5, wherein the engaging portion and the engaged portion constitute a dog clutch.

8. The power transmission device according to claim 5, wherein the one-way clutch is disposed closer to the coupling member than the engaging portion is to the coupling member on the power transmission path.

9. The power transmission device according to claim 8, comprising:
a hub configured to couple the engaging portion to the one-way clutch; and
a connecting member configured to connect the one-way clutch to the coupling member,
wherein the control unit includes a driving source configured to drive the engaging portion,
the engaging portion, the engaged portion, the hub, and the one-way clutch are disposed on an inner circumferential side of the driving source,
the engaging portion, the hub, and the one-way clutch are disposed in this order from outside to inside in a radial direction,
an outer race of the one-way clutch is integrated with the hub, and
an inner race of the one-way clutch is integrated with the connecting member.

* * * * *